(12) United States Patent
Karst

(10) Patent No.: US 8,518,602 B2
(45) Date of Patent: Aug. 27, 2013

(54) FUEL CELL ELECTRODE

(75) Inventor: Nicolas Karst, Folkling (FR)

(73) Assignee: STMicroelectronics (Tours) SAS, Tours (FR)

( * ) Notice: Subject to any disclaimer, the term of this patent is extended or adjusted under 35 U.S.C. 154(b) by 718 days.

(21) Appl. No.: 12/687,715

(22) Filed: Jan. 14, 2010

(65) Prior Publication Data

US 2010/0178595 A1    Jul. 15, 2010

(30) Foreign Application Priority Data

Jan. 15, 2009  (FR) ...................... 09 50211

(51) Int. Cl.
*H01M 2/20* (2006.01)
*H01M 8/04* (2006.01)
*H01M 8/10* (2006.01)
*H01M 4/86* (2006.01)

(52) U.S. Cl.
USPC ........... 429/517; 429/479; 429/519; 429/523; 429/535

(58) Field of Classification Search
USPC ................ 429/479–481, 484–490, 512, 517, 429/519–520, 522, 523–535
See application file for complete search history.

(56) References Cited

U.S. PATENT DOCUMENTS

| 5,874,182 | A  | * | 2/1999 | Wilkinson et al. ............ 429/443 |
| 6,232,010 | B1 | * | 5/2001 | Cisar et al. .................... 429/465 |
| 2002/0064698 | A1 | * | 5/2002 | Ren ................................ 429/30 |
| 2004/0038808 | A1 | * | 2/2004 | Hampden-Smith et al. .. 502/180 |
| 2004/0072057 | A1 |   | 4/2004 | Beatty et al. |
| 2004/0076868 | A1 | * | 4/2004 | Mardilovich et al. .......... 429/34 |
| 2004/0081878 | A1 |   | 4/2004 | Mardilovich et al. |
| 2007/0202378 | A1 |   | 8/2007 | D'Urso et al. |

FOREIGN PATENT DOCUMENTS

FR    2895573 A1    6/2007

OTHER PUBLICATIONS

French Search Report dated Aug. 6, 2009, from corresponding French Application No. 09/50211.

* cited by examiner

*Primary Examiner* — Jonathan Crepeau
*Assistant Examiner* — Jacob Buchanan

(57) ABSTRACT

A hydrogen-oxygen fuel cell including an electrolyte sandwiched between two catalyst layers or sheets, each catalyst layer or sheet being in contact with a porous electrode, in which one or several catalyst layers or sheets and one or several electrode layers or sheets interpenetrate.

22 Claims, 1 Drawing Sheet

FUEL CELL ELECTRODE

CROSS REFERENCE TO RELATED APPLICATIONS

This application claims the priority benefit of French patent application number 09/50211, filed on Jan. 15, 2009, entitled "FUEL CELL ELECTRODE," which is hereby incorporated by reference to the maximum extent allowable by law.

BACKGROUND OF THE INVENTION

1. Field of the Invention

The present invention relates to fuel cells and in particular, to hydrogen and oxygen fuel cells, and more specifically relates to the electrode structure of such cells.

2. Discussion of the Related Art

As illustrated in FIG. 1, a hydrogen-oxygen fuel cell comprises a layer or a sheet of an electrolyte 1 sandwiched between two catalyst layers or sheets 3 and 4 coated with conductive layers 6 and 7 intended for the contacting. The upper cell surface is in contact with oxygen, for example, air, and the lower cell surface is in contact with hydrogen.

Under such conditions, when the cell is connected to a load 8, a positive voltage appears on the side of the upper surface or cathode and a negative voltage appears on the side of the lower surface or anode and a current flows through the load. On the anode side, the catalyst transforms gaseous hydrogen molecules into two protons and two electrons, the protons flow from the anode catalyst layer, through the electrolyte layer to the cathode catalyst layer where reaction $2H^+ + \frac{1}{2}O_2 + 2e^- \rightarrow H_2O$ occurs, with both electrons flowing through the load.

Presently, electrolyte 1 is Nafion and catalyst 3, 4 is a mixture of platinum carbon, for example comprising a few percents of platinum, and preferably contains an amount of Nafion, for example, from 20 to 40%.

Conductors 6 and 7 for example are very thin gold layers to be both conductive and permeable to hydrogen or oxygen. Conductors 6 and 7 may also be formed of gold grids. In the case where conductors 6 and 7 are very thin gold layers, for example, of a thickness below 1 µm, to be sufficiently permeable to gas, they are poorly conductive since the catalyst layers are porous layers and the gold layers do not form even planar surfaces, but deposit discontinuously by penetrating into the catalyst pores. A problem of contact resistance (or current collection) thus arises. In the case where conductors 6 and 7 form a gold grid with meshes of a thickness from 2 to 3 µm, an obvious disadvantage is that, under the solid portions of the grid, the gas cannot react with the underlying catalyst.

Another parameter which adversely affects a satisfactory current collection is that the material of the catalyst, as indicated previously, preferably is a mixture of platinum carbon and electrolyte (for example, Nafion). The presence of Nafion in the catalyst layers enhances a good operation of the cell but since Nafion is a good proton conductor but a poor electron conductor, this increases the internal resistance of the cell. As a result, the proportion of Nafion has to be decreased in the catalyst, which adversely affects the efficiency of this catalyst. Indeed, when the amount of Nafion in the electrode is decreased, the proton conduction across the electrode bulk, and thus the amount of exchanged protons, is decreased.

FIG. 2 shows an embodiment of a hydrogen and oxygen fuel cell. The cell is formed from a support made of a portion of a silicon wafer 10, preferably thinned down in the portion where it supports the actual cell. In this thinned-down portion, openings 11 letting through oxygen are made in silicon wafer 10. It should be understood that, generally, all the wafer surfaces are coated with an insulator formed at least of native silicon oxide. An active cell area is delimited, substantially above the thinned-down region comprising the openings, by an insulator layer 12, for example, a silicon oxide layer. Inside of the opening formed in layer 12, a catalyst layer 3 is formed by any process, for example by inkjet deposition. An electrolyte 1, such as a Nafion layer, is, for example, spun on and covered with a second catalyst layer 4. Previously, a conductor 6, such as a gold anode layer, for example having a thickness on the order of one micrometer, has been formed on the surface of a support such as silicon wafer 10. Conductor 7 may be a gold cathode layer for example having a thickness on the order of one half micrometer formed on the upper surface of the structure. The foregoing is an example only of a possible embodiment of a hydrogen-oxygen fuel cell, this embodiment having the advantage of using technologies well known in silicon-based component manufacturing for the support. In such a structure, the contact between conductor 6 corresponding to a conductive anode layer and catalyst layer 3 is not a major issue but the quality of the contact between conductor 7 corresponding to a thin gold cathode layer and catalyst layer 4 is difficult to achieve if, as indicated previously, both a good collection of charge carriers and a good "transparency" of the layers for a proper diffusion of the oxygen in catalyst layer 4 are desired to be obtained. Currently, the useful surface area of the fuel cell ranges from 1 to 3 $cm^2$.

SUMMARY OF THE INVENTION

An embodiment of the present invention aims at solving at least some of the problems of prior art fuel cell contact electrodes.

An embodiment of the present invention aims at providing a novel hydrogen-oxygen fuel cell electrode structure enabling to improve the collection of electrons.

To achieve these and other objects, an embodiment of the present invention provides a hydrogen-oxygen fuel cell comprising an electrolyte sandwiched between two catalyst layers or sheets, each catalyst layer or sheet being in contact with a porous electrode, in which one or several catalyst layers or sheets and one or several electrode layers or sheets interpenetrate.

According to an embodiment of the present invention, the fuel cell comprises an alternation of catalyst layers and of electrode layers, the electrode layers being interconnected.

According to an embodiment of the present invention, the electrode snakes across the catalyst bulk, with a corrugated or rippled shape.

According to an embodiment of the present invention, the porous electrode layer is a layer of a conductive material of a thickness smaller than 1 µm, preferably on the order of from 0.2 to 0.6 µm.

According to an embodiment of the present invention, the porous electrode layer(s) is (are) a grid(s) of a conductive material.

According to an embodiment of the present invention, the conductive material is gold.

The foregoing objects, features, and advantages of the present invention will be discussed in detail in the following non-limiting description of specific embodiments in connection with the accompanying drawings.

DETAILED DESCRIPTION

Figure 1:
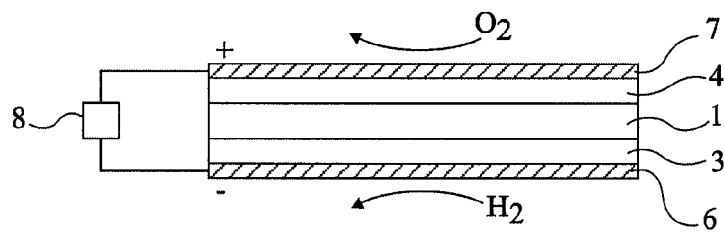
FIG. 1 is a cross-section view very schematically illustrating a fuel cell structure.
Figure 2:
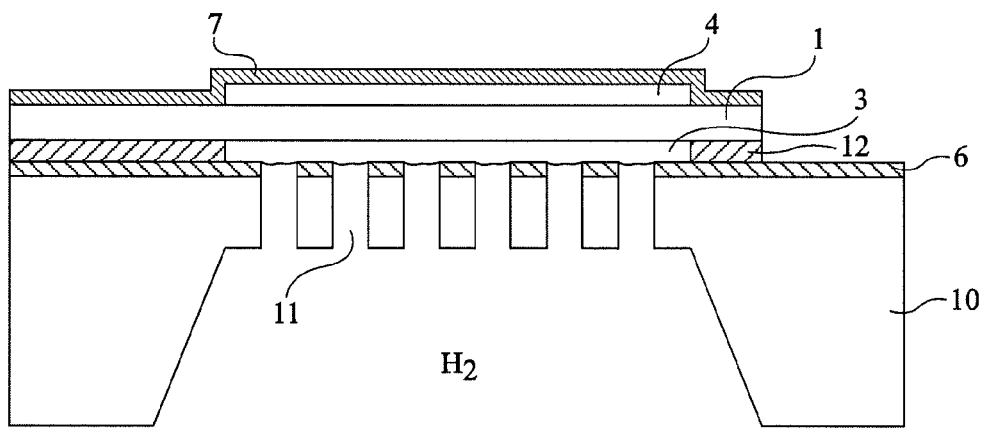
FIG. 2 is a cross-section view illustrating an embodiment of a fuel cell.
Figure 3:
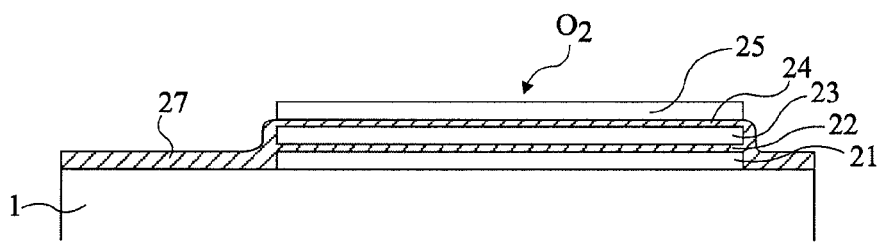
FIG. 3 is a cross-section view of a fuel cell electrode according to an embodiment of the present invention.

FIG. 3 is an enlarged view of the upper portion of an electrolyte 1 of a hydrogen-oxygen fuel cell. It may be an electrolyte sheet or a deposited layer. The following description will consider the case of an electrolyte layer on which are deposited catalyst and electrode layers. This should not be considered as a limitation and the present invention encompasses the case where the electrolyte is a sheet on which catalyst and electrode layers are deposited, the case where the electrolyte is a sheet against which are arranged catalyst and/or electrode sheets, and combinations of these various cases.

In FIG. 3, a layer 21 of a mixture of a material forming a catalyst, for example mainly comprising carbon powder, platinum, and a proportion of electrolyte, for example, Nafion, is deposited on electrolyte layer 1, for example by inkjet-type projection. A very thin gold layer 22 is deposited on catalyst layer 21, for example, by sputtering. After this, a second catalyst layer 23, a second very thin gold layer 24, and a final catalyst layer 25 are formed. The two gold layers 22 and 24 superpose at the periphery to form a thicker gold layer 27 on which a contact can be taken.

With this structure, the oxygen reaching the upper surface side reacts well with catalyst layer 25 and may cross very thin gold layers 24 and 22 to also react with catalyst layers 23 and 21. The very thin gold layers may have a thickness on the order of a few tenths of a μm, for example, from 0.2 to 0.6 μm, preferably on the order of 0.3 μm. On the other hand, given the interpenetration between the conductive layers and the catalyst layers, the catalyst layers can be more resistant without adversely affecting the quality of the current collection and the internal resistance of the cell. Thus, the catalyst layers can contain more Nafion than usual, and instead of containing from 20 to 40% of Nafion, they may for example contain on the order of from 35 to 45% of Nafion, which favors the reaction between oxygen, protons, and electrons and increases the amount of current that the cell may supply for a given voltage.

The present invention contemplates any other structure in which conductive layers interpenetrate catalyst layers. For example, in the case of the example of FIG. 3, instead of very thin gold layers, one or several gold grids of a thickness from 2 to 5 μm or grids of any other conductive material compatible with a contacting on or inside of the catalyst layer.

Figure 4:
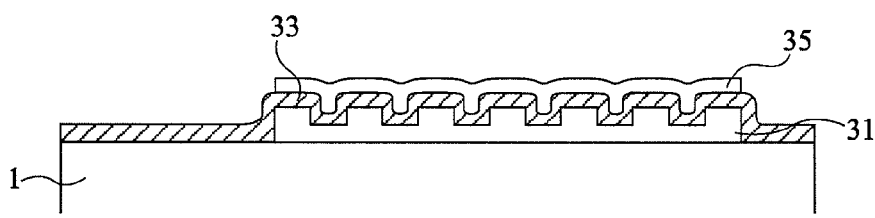
FIG. 4 is a cross-section view of a fuel cell electrode structure according to another embodiment of the present invention.

FIG. 4 shows an embodiment of the present invention in which, above electrolyte layer 1 is formed a first catalyst layer 31 having an uneven upper surface, so that a deposited gold layer 33 has an uneven shape, for example, the illustrated corrugated or wavy shape. This gold layer is then coated with a second catalyst layer 35. With such a structure, the same type of advantages as those described in relation with FIG. 3 is obtained. It should be noted that several thicknesses of gold layers with a corrugated surface such as layer 33 may alternate with catalyst layers. Once again, in this embodiment, the gold layer(s) may be replaced with gold grids.

The present invention has been more specifically described in relation with embodiments relating to a specific fuel cell embodiment in which various materials are deposited in successive layers. The present invention also applies to the case where the cell is formed of superposed sheets of the various materials, which are for example assembled under pressure.

Similarly, the present invention has been described in the context of a specific embodiment where a specific electrode structure is used for the contact with the cathode catalyst. The present invention may similarly also be implemented in relation with the anode layer, or only with it in some specific embodiments.

Various embodiments with different variations have been described hereabove. Those skilled in the art may combine various elements of these various embodiments and variations without showing any inventive step. Further, materials other than Nafion may be used for the electrolyte and materials other than carbon/platinum may be used for the catalyst, for example, carbon/platinum-cobalt or carbon/platinum-nickel.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A fuel cell comprising an electrolyte sandwiched between two catalysts, each catalyst comprising one or several catalyst layers and at least two porous electrode layers, wherein the one or several catalyst layers and the at least two porous electrode layers interpenetrate, wherein the one or several catalyst layers and the at least two porous electrode layers alternate, and wherein the at least two porous electrode layers are connected along a periphery to form a contact extending beyond the one or several catalyst layers.

2. The fuel cell of claim 1, wherein at least one of the at least two porous electrodes has a corrugated or rippled shape.

3. The fuel cell of claim 1, wherein each of the at least two porous electrode layers is a layer of a conductive material of a thickness smaller than 1 μm.

4. The fuel cell of claim 1, wherein at least one of the at least two porous electrode layers is a grid of a conductive material.

5. The fuel cell of claim 3, wherein the conductive material is gold.

6. The fuel cell of claim 3, wherein the layer of conductive material has a thickness from 0.2 to 0.6 μm.

7. The fuel cell of claim 1, wherein the catalyst layers comprise between 40% to 45% perfluorosulfonic acid polymer.

8. A fuel cell comprising:
an electrolyte layer;
alternating catalyst layers and electrode layers disposed on the electrolyte layer, wherein the electrode layers include at least two electrode layers connected along a periphery to form a contact extending beyond the catalyst layers.

9. The fuel cell of claim 8, wherein the catalyst layers comprise between 40% to 45% perfluorosulfonic acid polymer.

10. The fuel cell of claim 8, wherein the at least two electrode layers have a corrugated or rippled shape.

11. The fuel cell of claim 8, wherein the at least two electrode layers include a layer of conductive material having a thickness less than 1 μm.

12. The fuel cell of claim 11, wherein the layer of conductive material has a thickness from 0.2 to 0.6 μm.

13. The fuel cell of claim 8, wherein the at least two electrode layers are grids of a conductive material.

14. A method comprising the steps of:
depositing an electrolyte layer;
depositing alternating catalyst layers and electrode layers on the electrolyte layer, wherein at least two electrode layers are deposited;
connecting the at least two electrode layers along a periphery to form a contact extending beyond the catalyst layers.

15. The method of claim 14, wherein the catalyst layers comprise between 40% to 45% perfluorosulfonic acid polymer.

16. The method of claim 14, wherein the at least one of the at least two electrode layers has a corrugated or rippled shape.

17. The method of claim 14, wherein depositing the at least two electrode layers includes depositing a layer of conductive material having a thickness less than 1 µm.

18. The method of claim 17, wherein the layer of conductive material has a thickness from 0.2 to 0.6 µm.

19. The method of claim 14, wherein at least one of the at least two electrode layers is a grid of a conductive material.

20. The fuel cell of claim 1, wherein the contact is thicker than each of the at least two porous electrode layers.

21. The fuel cell of claim 8, wherein the contact is thicker than each of the at least two electrode layers.

22. The method of claim 14, wherein connecting the at least two electrode layers along a periphery to form a contact further comprises interconnecting the at least two electrode layers to form a contact thicker than each of the at least two electrode layers.

* * * * *